United States Patent [19]
Bakke et al.

[11] Patent Number: 5,726,983
[45] Date of Patent: Mar. 10, 1998

[54] COMMUNICATION DEVICE WITH VARIABLE FRAME PROCESSING TIME

[75] Inventors: Bradley B. Bakke, Lake in the Hills; Victoria Francesca Atienza Buenviaje, Deerfield, both of Ill.

[73] Assignee: Motorola, Inc., Schaumburg, Ill.

[21] Appl. No.: 694,739

[22] Filed: Aug. 9, 1996

[51] Int. Cl.[6] .................. H04B 7/212; H04J 3/22
[52] U.S. Cl. .................. 370/337; 370/347; 370/521
[58] Field of Search .................. 370/276, 280, 370/294, 321, 329, 336, 337, 345, 347, 477, 498, 500, 503, 521; 375/240

[56] References Cited

U.S. PATENT DOCUMENTS

| | | | |
|---|---|---|---|
| 4,701,955 | 10/1987 | Taguchi | 381/51 |
| 5,184,347 | 2/1993 | Farwell et al. | 370/94.1 |
| 5,241,545 | 8/1993 | Kazecki et al. | 370/337 |
| 5,268,933 | 12/1993 | Averbuch | 375/107 |
| 5,414,796 | 5/1995 | Jacobs et al. | 395/2.3 |
| 5,598,416 | 1/1997 | Yamada et al. | 370/468 |
| 5,633,862 | 5/1997 | Suzuki et al. | 370/280 |

Primary Examiner—Chau Nguyen
Attorney, Agent, or Firm—Daniel W. Juffernbruch

[57] ABSTRACT

A TDMA signal of frames of a nominal duration and having time slots is demodulated (120, 150, 160). A time slot assignment circuit (170) assigns and re-assigns time slots in a present and next frame based on TDMA control information. A real-time timing control circuit (180) determines a recovered-data duration for production of recovered data by a data decoder (190). The data decoder (190) produces the recovered-data during the receive-data duration by time compression or expansion during the next frame when a different time slot is re-assigned by the time slot re-assignment circuit (170).

20 Claims, 3 Drawing Sheets 5,726,983

COMMUNICATION DEVICE WITH VARIABLE FRAME PROCESSING TIME

BACKGROUND OF THE INVENTION

1. Technical Field

The present invention relates to a time division multiple access (TDMA) communication device and, more specifically, relates to a communication device for demodulating and processing a TDMA signal with varying time slots.

2. Description of the Related Art

Time division multiple access (TDMA) radios typically employ having a particular time slot assigned for communication with a particular remotely-located radio. The radio would decode the particular time slot during the frame to produce received information for a user. Differences in timing between TDMA signals transmitted between the remotely-located radio and a centrally-located radio have degraded performance.

Timing differences between TDMA signals to a remotely-positioned subscriber radio and the need for producing recovered data such as voice information for a user have typically been solved using a buffer. For example, U.S. Pat. No. 5,268,933 to Averbuch uses a buffer to adjust processing time to produce recovered voice data for a user. The buffer provides a fraction of a second audio delay but the fraction of a second delay is not noticeable in most communication systems having small audio delays. Communication systems having long audio delays in excess of a fraction of a second becomes a problem for the user. In a satellite communication system having long propagation distances or times, however, delay caused by the propagation distance between a satellite in orbit and a remotely-positioned subscriber radio on the earth further accentuates this problem. The additional fractional second delays added by such buffer in the above situations makes a real time communication for a user either uncomfortable or impossible.

DETAILED DESCRIPTION OF THE PREFERRED EMBODIMENTS

Figure 1:
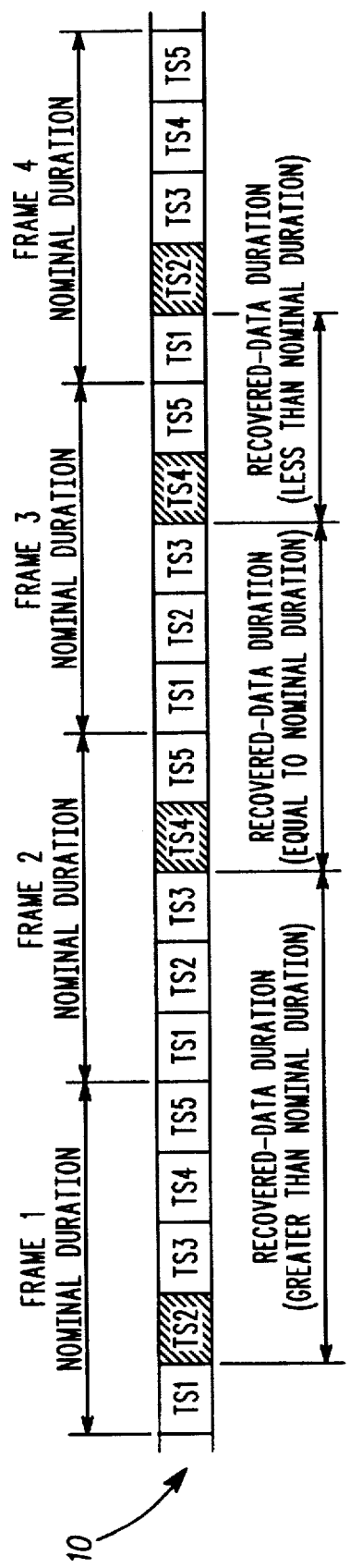
FIG. 1 illustrates a timing diagram showing frames and time slots of a received TDMA signal.

FIG. 1 illustrates a timing diagram of a received TDMA signal 10. The received TDMA signal 10 is composed of frame 1, frame 2, frame 3 and frame 4, each of the frames having a nominal duration of about 90 milliseconds (ms) in a preferred embodiment. Five time periods are respectively assigned to time slots TS1, TS2, TS3, TS4 and TS5 for each frame in the preferred embodiment. In an alternative example, more than one time period can be assigned to a time slot for each frame. In the TDMA signal 10 of the present invention, the radio operates on one time slot per frame. This one time slot per frame is shaded as illustrated in FIG. 1 as designated in the system by a TDMA controlled signal. For example, time slot TS2 is assigned for frame 1. In the next frame, time slot TS4 is re-assigned for frame 2. In frame 3, time slot TS4 is maintained and thus not re-assigned. In frame 4, the time slot is re-assigned to time slot TS2 as illustrated in the example. This re-assignment of frames is sometimes called time slot hopping.

Using the buffer of the prior art, a received time slot can be held for processing by a data decoder of a radio at the same time by using the buffer to shift time and cause congruent decoding times. In a system intolerable of delays, buffering must be avoided because it adds too much delay. The present invention thus alternatively decodes an assigned time slot to produce recovered data in real-time without the buffering and, instead, varies the duration in which the recovered data is available in only a next frame to accommodate time slot re-assignment.

In the exemplary re-assignment from time slot TS2 in frame 1 to time slot TS4 in frame 2, the recovered-data duration increases greater than the nominal duration as illustrated in FIG. 1. In the time slot re-assignment from time slot TS4 in frame 3 to time slot TS2 in frame 4, the recovered data duration is less than the nominal duration as illustrated in FIG. 1. However, such recovered-data duration change only differs from the nominal duration for only the one next time slot upon re-assignment. After re-assignment, subsequent frames have recovered data durations equal to the nominal duration. Thus, the present invention minimally alters the quality of recovered-data for one next frame upon re-assignment of a time slot without adding delay. Further, the affected recovered-data duration during, on average, half of the re-assignments, will require time expansion by a data decoder during a longer recovered-data duration and during the other half of the re-assignments require time compression to fit recovered-data duration different than the nominal duration.

Voice coders and decoders capable of handling variable frame sizes are known, for example, U.S. Pat. No. 5,414,796 to Jacobs et al. and U.S. Pat. No. 5,184,347 to Farwell et al. Farwell et al. compensate for oscillator drift in a receiver by adding or removing a few bits whenever correction for oscillator drift is performed, typically 25 times an hour, depending on oscillator quality. Farwell et al. trim a few bits from a bit-stream, by plus-or-minus less than 1%, to compensate for oscillator drift. This patent does not address how to handle the large time differences caused by re-assignment of time slots.

Further, the Jacobs et al. patent also does not address the large timing differences due to time slot re-assignment, in part, because its variable rate vocoder is applied to code division multiple access (CDMA) systems which do not use or re-assign time slots. The frame rate handled by the variable rate coder in this patent changes based an amount of data to be transmitted to reduce co-channel interference in the spread spectrum CDMA system. This patent is unconcerned with mitigating the timing problem caused by time slot re-assignment addressed by the present invention.

Figure 2:
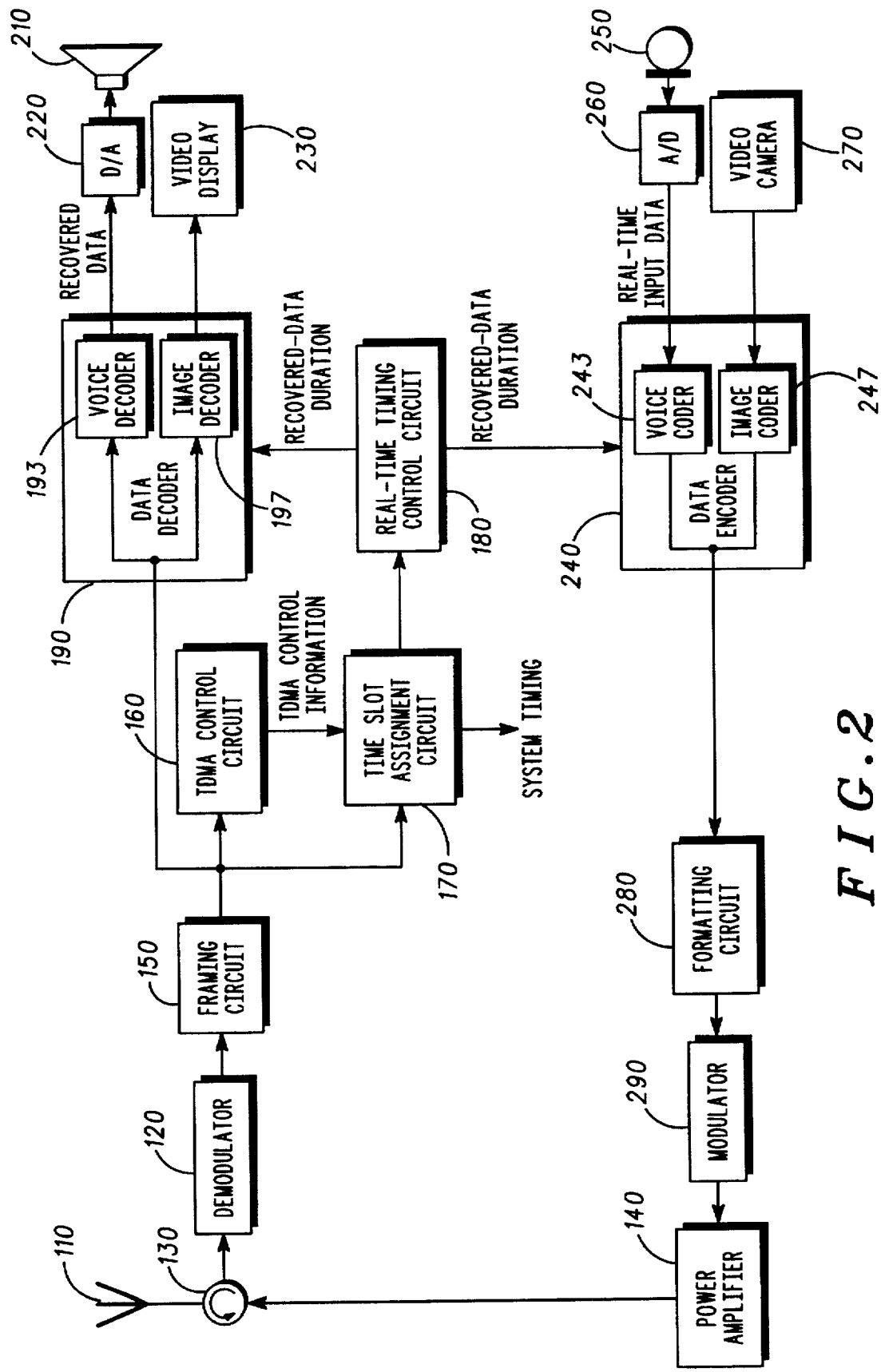
FIG. 2 is a schematic block diagram of a radio according to the present invention.

FIG. 2 illustrates a schematic block diagram of a radio according to the present invention. An antenna 110 receives a radio signal which is demodulated by a demodulator 120 via a circulator 130. The circulator 130 connects a power amplifier 140 of a transmit path to the antenna 110. The demodulator 120 demodulates the received TDMA signal. A framing circuit 150 sequentially partitions a demodulated signal from the demodulator 120 into frames of the nominal duration. A TDMA control circuit 160 extracts TDMA control information from the received signal. The TDMA control information provides system control including, in part, information indicating a certain time slot in each frame for processing by the radio. A time slot assignment circuit 170 assigns a time slot based on the time slot indicated by the TDMA control information. The time slot assignment circuit 170 also performs re-assignment of the time slot in a next frame when the TDMA control information indicates a different time slot shall be used for processing by the radio. The time slot assignment circuit 170 additionally provides for a system timing for the radio. For example, the demodulator 120, the framing circuit 150, and other portions of the radio such as a decoder power down and sleep for power conservation during unneeded portions of frames. The system timing determines when these portions of the radio must awake to receive information from the frame.

A real-time timing control circuit 180 determines the recovered-data duration when recovered data is made available to a user. A real-time timing control circuit 180 preferably determines the recovered data duration as the difference between the time of a present time slot and the time of the next time slot.

A data decoder 190 decodes the pertinent time slot in the frame from the framing circuit 150. The data decoder 190 performs time compression or expansion when the recovered-data duration indicated by the real-time timing control circuit 180 varies from the nominal duration during a frame of a next re-assigned time slot. The data decoder 190 performs time expansion by interpolation and performs time compression by decimation, for instance. Other techniques of time expansion and compression can be substituted for the interpolation or the decimation. The data decoder 190 can be one or both of a voice decoder 193 and an image decoder 197. The recovered data produced by the data decoder 190 can be played on a speaker 210 via a digital-to-analog converter 220 or displayed on a display such as a video display 230.

The invention is applicable in systems intolerable to delays where a user demands real-time transmission of data. The recovered data is time-compressed or expanded by the data decoder 190 to fit the variable recovered-data duration indicated by the real-time timing control circuit 180. The invention assumes and relies upon a user's brain's ability to be forgiving enough to recognize the time-expanded or time-compressed recovered data in order to satisfy the user's other demand for maintenance of real-time communication in the delay-sensitive environment. For example, in a voice radio system such as a radiotelephone, both a receive and transmit path are provided for a full-duplex communication. In full-duplex communication, a user of a radiotelephone must be able to speak at the same time that the user hears another party talking. This full-duplex situation where one speaks and listens at the same time is intolerable large delays such as those existing in satellite systems with large processing delays in addition to long propagation times.

The recovered-data duration preferably can vary by approximately 64% and approximately 136% of the nominal duration in a system with much more than five time slots of the example of FIG. 1. In the preferred embodiment, the nominal duration is about 90 milliseconds (ms) and eight time slots are present per frame after one approximately 22.5 millisecond header portion. Thus, the nominal duration can vary between 58 ms and approximately 122 ms.

FIG. 2 also illustrates a transmit path having a data encoder 240 for assembling time slots based on real-time input data from, for example, a microphone 250 via a analog-to-digital converter 260 or a video camera 270. The data encoder 240 is similarly constructed with the data decoder 190 to time expand or time compress based on the recovered data duration from the real-time timing control circuit 180. The data encoder 240 also can contain one or both of the voice coder 243 and an image coder 247. Both a voice coder 243 and voice decoder 193 would make up what sometimes is called a vocoder.

A formatting circuit 280 in the transmitting path formats the assembled time slot from the data encoder 240 into frames based on the system timing. A modulator 290 modulates the frames by the formatting circuit 280 and transmits them via the power amplifier 140 by the antenna 110. The antenna 110, circulator 130 and power amplifier 140 could, alternatively, be substituted by a wired network such as telephone, computer or fiber network. Further, the antenna 110 could be implemented in a wired RF cable network. Although both the transmit and receive paths can be constructed as illustrated in FIG. 2 in a single transceiver, either one of the receive path and the transmit path may be constructed independently, for example, in a transmit only or a receive only device. Further, the transmit or receive path may exist independently in a system where only one direction, such as a downlink direction, has time slot re-assignment, but the other, or uplink, direction does not have time slot re-assignment.

Figure 3:
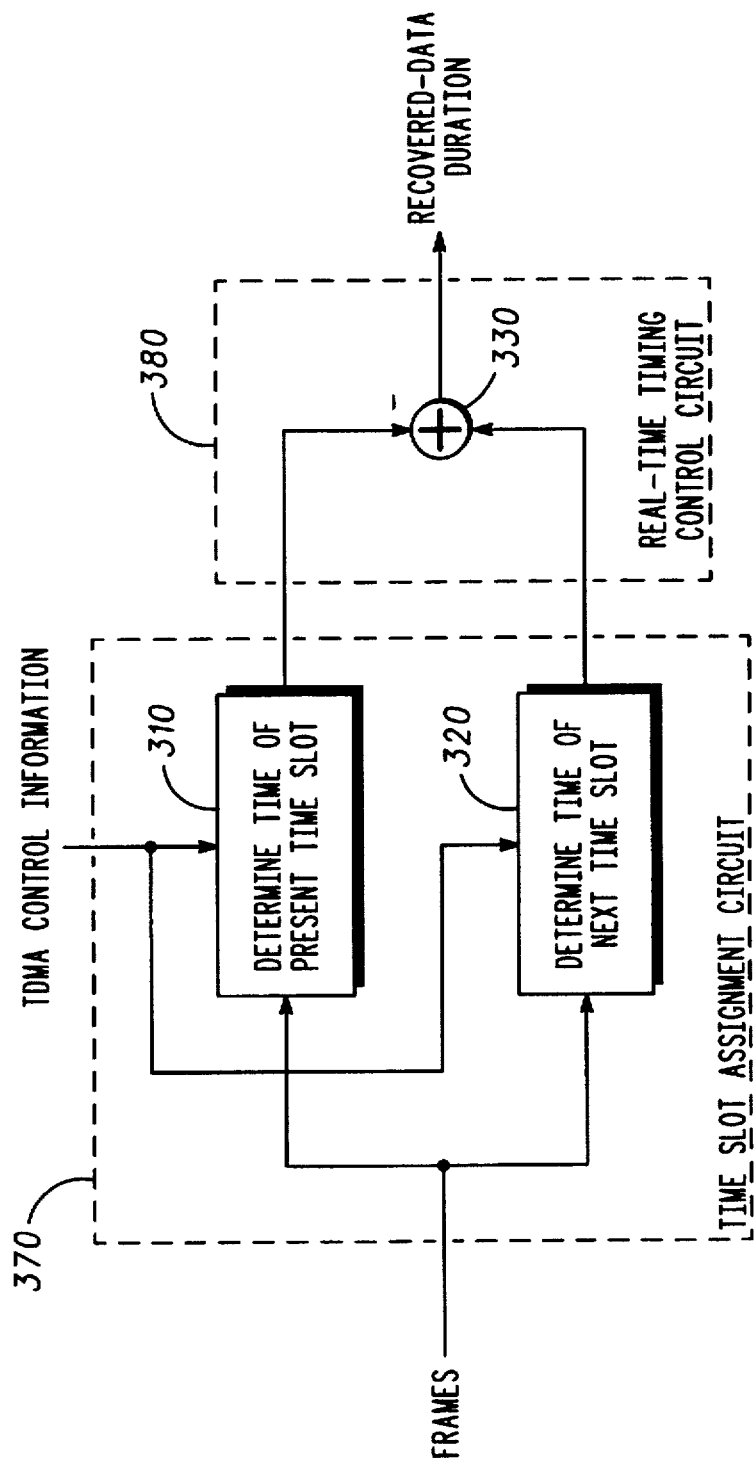
FIG. 3 is a schematic block diagram of a time slot assignment circuit and a real-time timing control circuit.

FIG. 3 illustrates details of the time slot assignment circuit 170 and the real-time timing control circuit 180 according to a preferred embodiment. A time slot assignment circuit 370 receives TDMA control information and frames and determines the time of a present time slot by decision circuit 310 and determines a time of the next time slot by decision circuit 320. A real-time timing control circuit 380 contains a subtractor 330 for subtracting the time of the present time slot from the time of the next time slot and determining the recovered-data duration for use by the decoder or encoder. The real-time timing control circuit 380 could alternatively be contained in or derived from the TDMA control information itself.

The signal processing techniques of the present invention disclosed herein with reference to the accompanying drawings are preferably implemented on one or more digital signal processors (DSPs) or other microprocessors. Nevertheless, such techniques could instead be implemented wholly or partially as discrete components.

Although the invention has been described and illustrated in the above description and drawings, it is understood that this description is by example only and that numerous changes and modifications can be made by those skilled in the art without departing from the true spirit and scope of the invention. Although the present invention has substantial advantages in a system sensitive to delay, the present invention is applicable to other communication systems regardless of delay tolerance such as paging, cellular and other satellite communications systems. Further, additional data other than images or voice information could be accommodated for use in differing applications and environments.

What is claimed is:

1. A communication device for receiving a received time division signal of frames having time slots, the frames of a nominal duration, comprising:

a demodulator for demodulating the received time division signal to produce a demodulated signal;

a framing circuit operatively coupled to the demodulator to sequentially partition the demodulated signal into frames of the nominal duration;

a time division control circuit operatively coupled to the framing circuit to extract time division control information from within the frames which indicates a certain time slot for real-time processing by the communication device;

5 a time slot assignment circuit operatively coupled to the framing circuit and the time division control circuit to, based on a time slot indicated by the time division control information, dynamically assign a present time slot for real-time processing by the communication device and to, based on a different time slot indicated by the time division control information, dynamically re-assign a next time for real-time processing by the communication device;

a real-time timing control circuit operatively coupled to the time slot assignment circuit to determine a recovered-data duration for producing recovered data, wherein the recovered-data duration will vary from the nominal duration during a next time slot re-assigned by the time slot assignment circuit; and a data decoder operatively coupled to the framing circuit and the real-time timing control circuit to decode the present time slot of a frame and produce recovered data real-time during the recovered-data duration and wherein, when the real-time timing control circuit varies the recovered-data duration from the nominal duration for a next time slot upon re-assignment, the decoder thereby performs time expansion or compression to produce recovered data.

2. A communication device according to claim 1, wherein the real-time timing control circuit determines the recovered-data duration as the duration between a time of a present time slot and a time of the next time slot when a next time slot is re-assigned by the time slot assignment circuit.

3. A communication device according to claim 1, wherein the real-time timing control circuit increases the recovered-data duration when a next time arrives later in a next frame than the present time slot arrived in a present frame and wherein the real-time timing control circuit decreases the recovered-data duration when a next time arrives earlier in a next frame than the present time slot arrived in a present frame.

4. A communication device according to claim 1, wherein the data decoder comprises a real-time image data recovery circuit to produce real-time image data.

5. A communication device according to claim 1, wherein the data decoder comprises a real-time voice decoder to produce real-time voice data.

6. A communication device according to claim 1, wherein each time slot has the same duration.

7. A communication device according to claim 1, wherein the recovered-data duration can reach up to twice the nominal duration.

8. A communication device according to claim 1, wherein the recovered-data duration can vary between approximately 64 percent and approximately 136 percent of the nominal duration.

9. A communication device according to claim 8, wherein the nominal duration can vary between approximately 58 milliseconds and approximately 122 milliseconds.

10. A communication device according to claim 1, wherein the nominal duration is approximately 90 milliseconds.

11. A communication device according to claim 1, further comprising a digital-to-analog converter operatively coupled to the data decoder to convert the recovered data to analog data during the recovered-data duration.

12. A communication device according to claim 1, further comprising a man-machine user interface operatively coupled to the data decoder to receive the recovered data during the recovered-data duration.

13. A communication device according to claim 12, wherein the man-machine user interface comprises an audio

6 transducer for playing the recovered data during the recovered-data duration.

14. A communication device according to claim 12, wherein the man-machine user interface comprises a display for playing the recovered data during the recovered-data duration.

15. A communication device according to claim 1, further comprising:

a data coder for receiving in real-time input data over the recovered-data duration and for coding the real-time input data into a time slot;

a formatting circuit operatively coupled to the data coder to format the time slot into formatted frames of the nominal duration; and a modulator operatively coupled to the formatting circuit to modulate the formatted frames to produce a modulated signal for transmission by the communication device.

16. A communication device according to claim 15, further comprising a microphone operatively coupled to the data coder to receive the real-time input data over the recovered-data duration.

17. A communication device according to claim 15, further comprising a camera operatively coupled to the data coder to receive the real-time input data over the recovered-data duration.

18. A communication device according to claim 15, wherein the real-time timing control circuit, the data decoder and data-decoder are suited for real-time full-duplex voice communication.

19. A communication device according to claim 15, wherein the communication device is a radio and further comprises a power amplifier operatively coupled to the modulator;

an antenna operatively coupled to the demodulator and the power amplifier;

a speaker operatively coupled to the decoder; and a microphone operatively coupled to the data coder.

20. A communication device for a received TDMA signal having frames of a nominal duration, comprising:

a demodulator for demodulating the received TDMA signal to produce a demodulated signal;

a framing circuit operatively coupled to the demodulator to sequentially partition the demodulated signal into frames of the nominal duration and time slots within the frames;

a TDMA control circuit operatively coupled to the framing circuit to extract TDMA control information within the frames;

a time slot assignment circuit operatively coupled to the framing circuit and the TDMA control circuit to dynamically reassign time slots for the communication device during a real-time communication based on the TDMA control information;

a real-time voice decoder operatively coupled to the framing circuit to decode a present time slot and produce recovered real-time voice data during a recovered-data duration;

a real-time timing control circuit operatively coupled to the real-time voice decoder and the time slot assignment circuit to determine the recovered-data duration for producing real-time voice data by the real-time voice decoder, wherein the recovered-data duration will vary from the nominal duration when a next time slot is re-assigned by the time slot assignment circuit and, wherein the real-time timing control circuit determines the recovered-data duration as the duration between a time of a present time slot and a time of the next time slot when a next time slot is re-assigned by the time slot assignment circuit;

a real-time voice encoder operatively coupled to the real-time timing control circuit for receiving in real-time voice data over the recovered-data duration and to code the real-time voice data into a time slot;

a formatting circuit operatively coupled to the real-time voice encoder to format the time slot into frames of the nominal duration; and a modulator operatively coupled to the formatting circuit to modulate the frames to produce a modulated signal for transmission by the communication device.

* * * * *